United States Patent

Aihara et al.

Patent Number: 5,361,251
Date of Patent: Nov. 1, 1994

[54] PASSING CELL MONITORING DEVICE OPERATED USING AN ATM SWITCHING UNIT

[75] Inventors: Naoki Aihara; Shuji Yoshimura, both of Kawasaki; Naoki Fukuda, Fukuoka; Tadashi Hoshino, Kawasaki, all of Japan

[73] Assignee: Fujitsu Limited, Kanagawa, Japan

[21] Appl. No.: 854,476

[22] Filed: Mar. 17, 1992

[30] Foreign Application Priority Data

Mar. 20, 1991 [JP] Japan .................. 3-056447

[51] Int. Cl.$^5$ ................................ H04L 12/56
[52] U.S. Cl. ........................ 370/60; 370/23
[58] Field of Search ........... 370/17, 94.1, 60, 110.1, 370/19, 23, 110.4, 60.1, 94.2, 13; 364/726, 724.09, 576; 324/77 E

[56] References Cited

U.S. PATENT DOCUMENTS

| | | | |
|---|---|---|---|
| 4,594,706 | 6/1986 | Kobayashi | 370/95.3 |
| 4,993,024 | 2/1991 | Quinquis et al. | 370/94.1 |
| 5,012,466 | 4/1991 | Buhrke et al. | 370/110.1 |
| 5,117,417 | 8/1992 | Dunner | 370/17 |
| 5,119,364 | 6/1992 | Thiebant et al. | 370/94.1 |
| 5,132,964 | 7/1992 | Esaki | 370/60 |
| 5,140,588 | 8/1992 | Dunner | 370/17 |

FOREIGN PATENT DOCUMENTS

| | | |
|---|---|---|
| 9000331 | 1/1990 | European Pat. Off. |
| 0384758 | 8/1990 | European Pat. Off. |
| 252489 | 12/1987 | Germany |
| 9005416 | 5/1990 | World Int. Prop. O. |

OTHER PUBLICATIONS

P. Lynn, "The Analysis and Processing of Signals", MacMillan Press, 1973, pp. 104–108, Hong Kong.

Primary Examiner—Douglas W. Olms
Assistant Examiner—Ajit Patel
Attorney, Agent, or Firm—Staas & Halsey

[57] ABSTRACT

It is determined whether or not a passing cell is a cell to be measured. If yes, a signal synchronous with the passing cycle of the cell is generated by a synchronous signal generator. The synchronous signal is digitally processed by a digital signal processor. Thus, each parameter related to the number of passing cells is obtained by converting the analysis based on the time axis to the area analysis based on the frequency axis.

10 Claims, 4 Drawing Sheets

PASSING CELL MONITORING DEVICE OPERATED USING AN ATM SWITCHING UNIT

BACKGROUND OF THE INVENTION

The present invention relates to a passing cell monitoring device operated with an ATM (Asynchronous Transfer Mode) Switching Unit in a B-ISDN (broadband ISDN).

Unlike a conventional switching unit, an ATM switching unit provides various types of services for subscribers. Since a subscriber's charge and the management of a switching unit's band depend on the types of services the switching unit provides, a supplier and a subscriber usually negotiate before determining the types of services to be provided.

According to the agreement between them, the switching unit provides the subscriber with an information switching service in a predetermined band.

If the subscriber transmits for some reasons the information of the band beyond the predetermined speed to the switching unit, the switching unit will be subject to abnormal conditions such as information confusion, etc. due to an illegal usage of the band resources of the switching unit. To prevent such abnormal situations, a regulating process referred to as a "police" is performed.

In the regulating process "police", a subscriber corresponder of the switching unit counts according to a virtual path identifier/virtual channel identifier (VPI/VCI), the number of cells passing within a predetermined period, compares the result with a predetermined threshold, and controls according to the result whether or not the cell being checked can be passed. This process is controlled according to the hardware logic.

The observation data to be used in performing the "police" function include average band, maximum band, and burst retaining period data. Therefore, in the above device in which the number of cells passing within a predetermined time period is counted and the result is compared with a predetermined threshold, each parameter is calculated based on the number of cells passing within the predetermined period. At some unit time, the counting operation may not be able to keep up with the fluctuation of the number of passing cells. Therefore, it is very difficult to obtain a reliable police function in the prior art technology. That is, the number of passing cells always fluctuates. Sometimes, a lot of cells pass and then none pass. The conventional device cannot handle such a condition, and can not perform a reliable police function.

SUMMARY OF THE INVENTION

The present invention relates to a passing cell monitoring device operated with an ATM switching unit. An object of the present invention is to realize a passing cell monitoring device operated using an ATM switching unit for accurately monitoring the number of passing cells regardless of fluctuations in number by obtaining each parameter related to the number of passing cells according to the area analysis based on the frequency axis.

A feature of the present invention resides in its configuration comprising a cell determiner for determining whether or not a passing cell is one to be measured, a divider for outputting a pulse when the number of times a cell is determined by the cell determiner as one to be measured matches a predetermined value, and a detector for detecting the number of passing cells according to the cycle of the pulse of the dividing means.

DESCRIPTION OF THE PREFERRED EMBODIMENT

Figure 1:
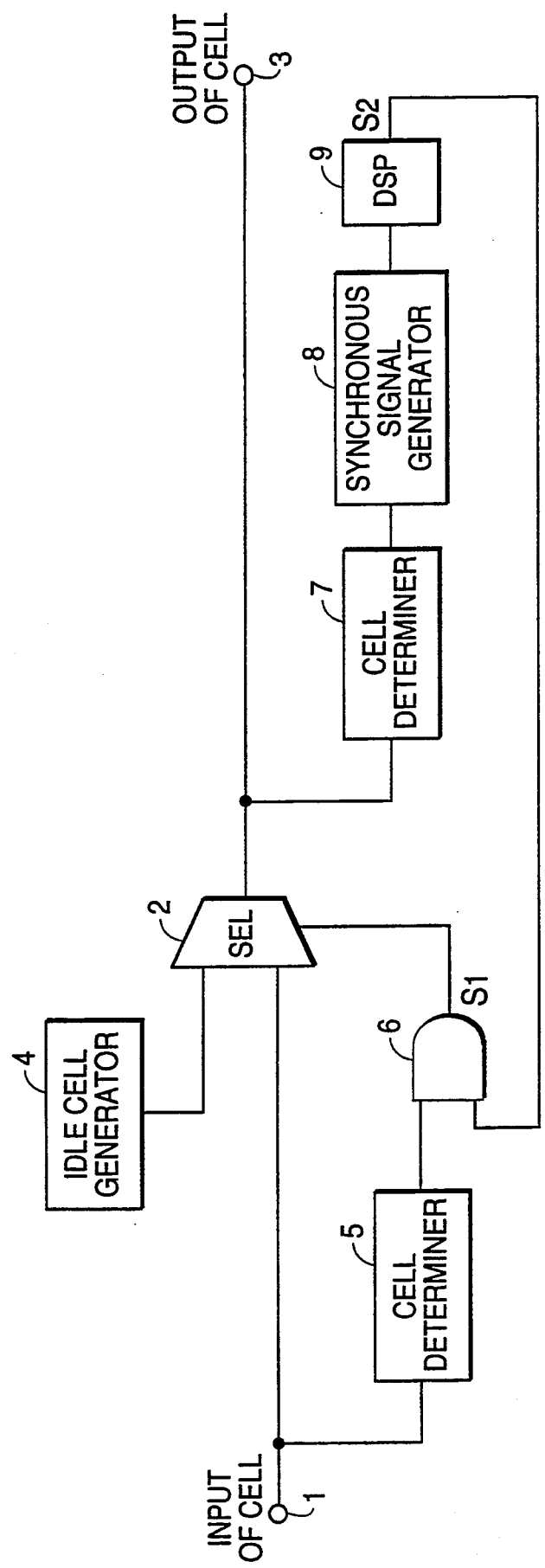
FIG. 1 is a configuration diagram for explaining the principle of the present invention.

FIG. 1 is a configuration diagram for explaining the principle of the present invention. In this configuration, cells enter from an input terminal 1 and are outputted from an output terminal 3 through a selector 2. The selector 2 normally passes the cells, but prevents them from passing through using a cell passage prevention signal to select idle (invalid) cells provided by an idle cell generator 4.

A cell determiner 5 determines whether or not the VPI/VCI of an inputted cell indicates a cell to be observed. If yes, the output is sent to one input terminal of an AND circuit 6. Another cell determiner 7 is similar to the cell determiner 5, determines whether or not the VPI/VCI of a passing cell indicates a cell to be observed. If the passing cell is determined by the cell determiner 7 as a cell to be observed, it is inputted to a synchronous signal generator 8. Each time a cell arrives, the synchronous signal generator 8 outputs 0 and 1 alternately. It divides a passing cell and outputs a signal synchronous with its cycle. The output is applied to a digital signal processor (hereinafter referred to as a DSP) 9, sampled in the DSP 9, and then digitally processed.

The DSP 9 measures the average band (average passing cycle), maximum band (minimum passing cycle), and burst retaining time (minimum passing cycle retaining time). When a parameter indicates a value larger than the threshold, a discard signal $S_2$ for discarding the cell is outputted. The discard signal $S_2$ is applied to the AND circuit 6, processed in an AND operation with the output provided by the cell determiner 5, and then outputted to the selector 2 as a cell passage prevention signal $S_1$.

In a normal cell flow, a cell is applied to the input terminal 1 and outputted from the output terminal 3 through the selector 2. The cell determiner 5 determines whether or not the VPI/VCI of the inputted cell matches the value set in the cell determiner 5, and also determines whether or not the cell is to be observed. If yes, a coincident result is sent to the AND circuit 6. The coincident result is outputted at the timing at which the cell passes through the selector 2.

The cell determiner 7 determines whether or not the VPI/VCI of the cell matches a predetermined value. If yes, a cell signal is applied to the synchronous signal generator 8. The synchronous signal generator 8 generates a signal synchronous with the cycle of a passing cell.

The DSP 9 processes using a digital signal a synchronous signal generated by the synchronous signal generator 8 to obtain each of the parameters related to the number of passing cells such as an average band, maximum band, and burst retaining time of a cell. These parameters are obtained by the area analysis based on the frequency axis converted from the analysis based on the time axis. When a parameter exceeds a predetermined value, a cell discard signal $S_2$ is outputted. Then, the discard signal $S_2$ is applied to the AND circuit 6, processed in an AND operation with the coincident output provided by the cell determiner 5, and then outputted to the selector 2 as a cell passage prevention signal $S_1$ to randomly prevent cells from being observed.

On receiving the cell passage prevention signal $S_1$, the selector 2 selects an idle cell (invalid cell) generated by the idle cell generator 4 to invalidate the passing cell.

As described above, the DSP 9 measures an average band (average passing cycle), maximum band (minimum passing cycle), and burst retaining time (minimum passing cycle retaining time) of a passing cell in order to output a cell discard signal when these parameters exceed predetermined values. The necessary operation is performed in the DSP by performing a Fourier transformation and obtaining a coefficient of each degree term and a power value of a frequency in a specific band after passing sample data through a digital filter.

With these coefficients and power values, an average band, a maximum band, and a burst retaining time can be easily calculated. Since these operations performed in the DSP 9 are already well known, their detailed explanation is skipped in the specification of the present invention.

Thus, a signal synchronous with the cycle of a passing cell is generated and the synchronous signal is processed using a digital signal in order to obtain a parameter related to the number of passing cells by the area analysis based on the frequency axis converted from the analysis based on the time axis. Therefore, the present invention enables a reliable process regardless of fluctuations in cell flow.

Figure 2:
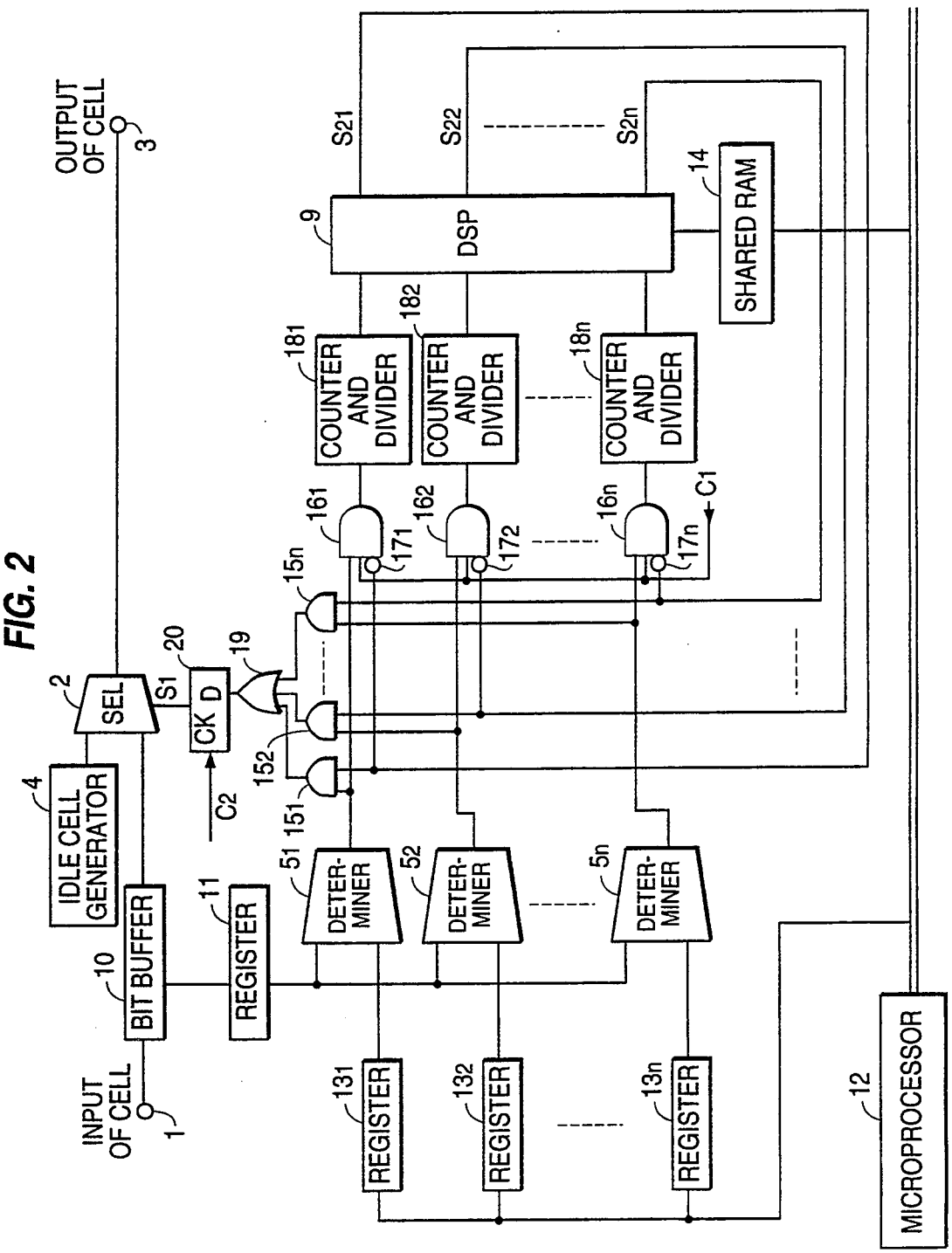
FIG. 2 shows the configuration of the embodiment in which the present invention is applied as a police function.

An embodiment of the present invention applied as a police function is described below. In FIG. 2, parts similar to those shown in FIG. 1 are assigned the same identification number and their explanation is skipped here. Normally, a cell is applied to the input terminal 1, passed to a bit buffer 10, and outputted from the output terminal 3 through the selector 2.

A cell inputted to the input terminal 1 is passed through the bit buffer 10 and a register 11, and applied to one input terminal of cell determiners $5_1, 5_2, \ldots, 5_n$.

A microprocessor 12 receives from an upper grade unit, not shown in this figure, a band of each call assigned at the time of a request for a call process. Additionally, in the microprocessor 12, a band value of each call, that is, a VPI/VCI corresponding to each call and its specified band, are sent to registers $13_1, 13_2, \ldots, 13_n$, and to the DSP 9 through a shared RAM 14. The number of registers is determined to be the number of specified cell types.

The output terminals of registers $13_1, 13_2, \ldots, 13_n$ are connected to the other input terminals of cell determiners $5_1, 5_2, \ldots, 5_n$. The output terminals of cell determiners $5_1, 5_2, \ldots, n$ are connected to the other input terminals of AND circuits $15_1, 15_2, \ldots, 15_n$ and simultaneously connected to the other input terminals of AND circuits $16_1, 16_2, \ldots, 16_n$.

The cell discard signal output terminal of the DSP 9 is connected to the above AND circuits $15_1, 15_2, \ldots, 15_n$ and AND circuits $16_1, 16_2, \ldots, 16_n$. One of cell discard signals $S_{21}, S_{22}, \ldots, S_{2n}$ outputted from the DSP 9 is provided to the corresponding AND circuits $15_1, 15_2, \ldots, 15_n$ and the AND circuits $16_1, 16_2, \ldots, 16_n$. However, cell discard signals $S_{21}, S_{22}, \ldots, S_{2n}$ are provided to AND circuits $16_1, 16_2, \ldots, 16_n$ through inversion elements $17_1, 17_2, \ldots, 17_n$. A clock $C_1$ is connected to the other input terminals of AND circuits $16_1, 16_2, \ldots, 16_n$. The outputs of AND circuits $16_1, 16_2, \ldots, 16_n$ are applied to the counter and dividers $18_1, 18_2, \ldots, 18_n$, counted, that is, divided, and then applied to the DSP 9.

The outputs of AND circuits $15_1, 15_2, \ldots, 15_n$ are applied to an OR circuit 19, and the OR output is applied to the input terminal (D) of a D type flip-flop 20. A clock $C_2$ is applied to the clock input terminal CLK of the D type flip-flop 20, and the output of the D type flip-flop 20 is provided to the selector 2 as the cell passage prevention signal $S_1$. The prevention signal $S_1$ switches the selection of the selector 2, and an idle cell is outputted to invalidate an inputted cell.

The operation conducted in the above configuration is described below. First, the band of each cell determined at the time of a request for the cell is stored in the microprocessor 12 through an upgraded unit not shown in this figure. The microprocessor 12 stores the value (the VPI/VCI corresponding to each cell and its specified band) into registers $13_1, 13_2, \ldots, 13_n$, and sends it to the DSP 9 through the shared RAM 14.

If a cell is applied to the input terminal 1 in this state, each of the cell determiners $5_1, 5_2, \ldots, 5_n$ determines whether or not the VPI/VCI value of the cell matches the value stored in the registers $13_1, 13_2, \ldots, 13_n$. If yes, a coincident output is provided by the coincidental cell determiner. For example, if the VPI/VCI value of an inputted cell matches the value stored in register $13_1$, a coincident output is provided by the cell determiner $5_1$, and the coincident output is applied to the AND circuit $15_1$ and the AND circuit $16_1$. Unless the cell discard signal $S_{21}$ is outputted from the DSP 9 in the AND circuit $16_1$, the output of the cell determiner $5_1$ is processed in an AND operation with the inversion output (active) of the cell discard signal $S_{21}$ (inactive) and the clock $C_1$, and applied to the counter and a divider $18_1$. The counter is counted up and divided. A signal synchronous with the passing cycle of the cell is outputted from the counter and the divider $18_1$.

The reason for dividing the counter output is that the DSP 9 must complete one process in the cycle with the maximum band of 500 KHz at maximum (in a 155 Mbps transmission line) of passing cells and that the DSP 9 must be provided with sufficient capabilities to perform a process. Generally, since there are a plurality of cells for each VPI/VCI value to be processed by one subscriber corresponder, a process performed by the DSP 9 becomes heavier, and the number of dividing steps must be determined according to the system specification.

Thus, a signal synchronous with the passing cycle of a passing cell is generated using the counter and the divider $18_1$, and the DSP 9 uses this signal to obtain a coefficient of each degree term by performing a Fourier transformation on sample data, or to obtain a power value of a frequency in a specific band by passing the sample data through a digital filter. With the coefficient and the power value, an average band, maximum band, and burst retaining time can be easily calculated. If each of the parameters exceeds a value predetermined between the supplier and the subscriber, a signal $S_{21}$ for discarding a corresponding cell is outputted.

The discard signal $S_{21}$ is applied to the AND circuit $15_1$ and processed in an AND operation with the output of the cell determiner $5_1$. The result is supplied to the D type flip-flop 20 through an OR circuit 19 at the timing of the clock $C_2$. The output of the D type flip-flop is applied to the selector 2 as a cell passage prevention signal $S_1$.

The selector invalidates a cell input and selects as an invalid cell an idle cell generated by the idle cell generator 4, thus discarding the inputted cell.

The cell discard signal $S_2$ from the DSP 9 is also applied to the AND circuit $16_1$, but inverted by the inversion element $17_1$. Therefore, the output of the determiner $5_1$ is not applied to the counter or the divider 18, and the counter is not updated.

As described above, determination is made as to which one of the values stored in registers $13_1$, $13_2$, cell. According to the result, a signal synchronous with the passing cycle of the cell is generated. The DSP 9 digitally processes the synchronous signal to obtain each parameter related to the number of passing cells by converting the analysis based on the time axis to the area analysis based on the frequency axis. If each of the parameters exceeds a predetermined value, a cell discard signal (a cell discard signal $S_{21}$ in this embodiment) is outputted by the DSP 9, and a cell preventing signal $S_1$ is outputted to the selector 2, thus invalidating the passing cell.

Since the parameters related to the number of passing cells are obtained according to the area analysis based on the frequency axis, the present invention enables an efficient regulation of the number of passing cells at real time.

Figure 3:
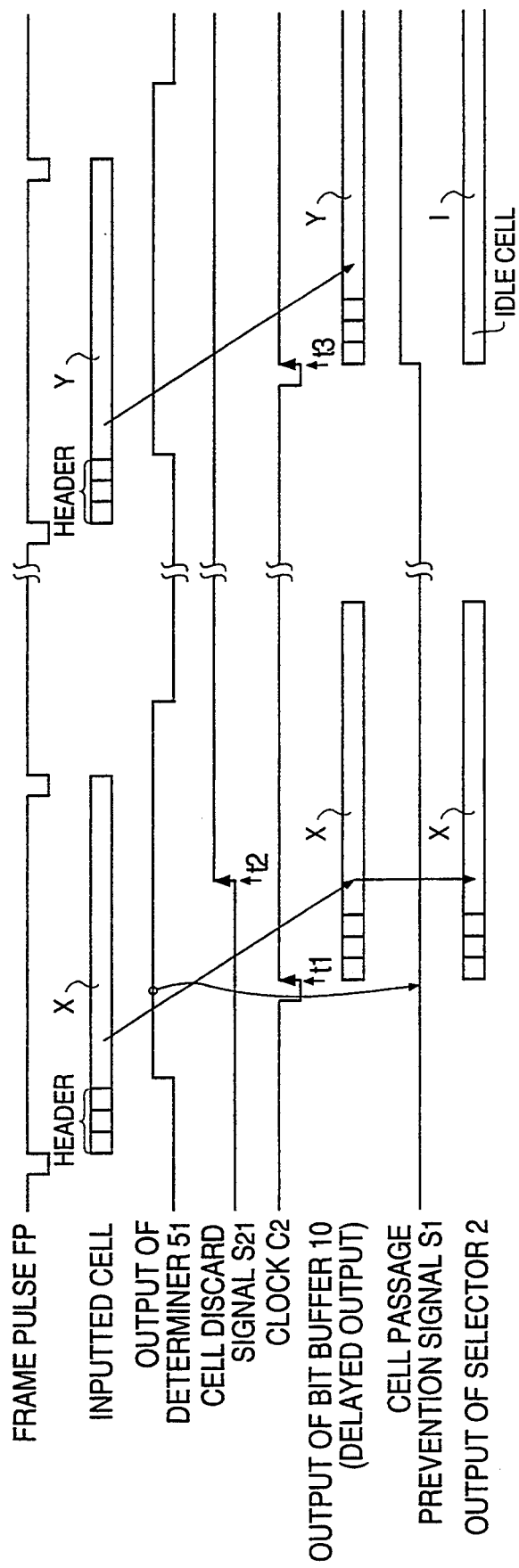
FIG. 3 is an operational timing chart of the embodiment of the present invention shown in FIG. 2.

The operation of the embodiment of the present invention shown in FIG. 2 is explained in detail below. FIG. 3 is an operational timing chart of the embodiment of the present invention. FIG. 3 shows a timing at which a cell corresponding to the VPI/VCI stored in the register $13_1$ is inputted.

A frame pulse FP indicates an input cell intake timing. The bit buffer 10, not shown in the figure, takes in a cell at the rise of the frame pulse. The header of a taken-in cell is applied to the determiner $5_1$, and the determiner $5_1$ determines whether or not the header matches the VPI/VCI stored in the register $13_1$. If yes, the determiner $5_1$ outputs an H level. The H level is applied to the counter $18_1$ and divided through the AND circuit $16_1$. For example, if a carry is not outputted when the dividing process is performed, the DSP 9 takes no action and the cell discard signal $S_{21}$ outputs an L level. At this time, the AND gate $15_1$ to which the cell discard signal $S_{21}$ is applied remains "OFF" and outputs an L level. When the same cell X is inputted several times, a carry is outputted from the counter $18_1$. The carry is outputted when a pulse of the clock C1 is applied after the determiner $5_1$ turns to the H level. Since the clock $C_2$ is applied to the D type flip-flop 20 before the output of the carry, the D type flip-flop 20 enters the L level at the time $t_1$. At this time, the selector 2 enters the L level and selects the inputted cell X. The selector 2 is also provided with a cell delayed by the bit buffer 10, and it selects the delayed cell.

When a band predetermined by the DSP 9 is exceeded after a falling pulse of the clock $C_2$ is applied, the DSP 9 changes the cell discard signal $S_{21}$ at the time $t_2$.

If subsequent cells are applied or no cells are inputted, the output of the determiner $5_1$ turns to the L level. The cell discard signal outputted by the DSP 9 remains at the H level.

When a cell Y having the same VPI/VCI as that stored in the register $13_1$ is inputted, the output of the determiner $5_1$ turns to the H level. Since the cell discard signal $S_{21}$ is also at the H level, the output of the AND gate $15_1$ turns to the H level. Therefore, the H level is applied to the D type flip-flop 20 through the OR gate 19, and the D type flip-flop 20 takes in the H level at the rise of the clock $C_2$ at the time $t_3$. When the D type flip-flop 20 takes in the H level, the selector 2 selects and outputs an idle cell I generated by the idle cell generator 4.

Figure 4:
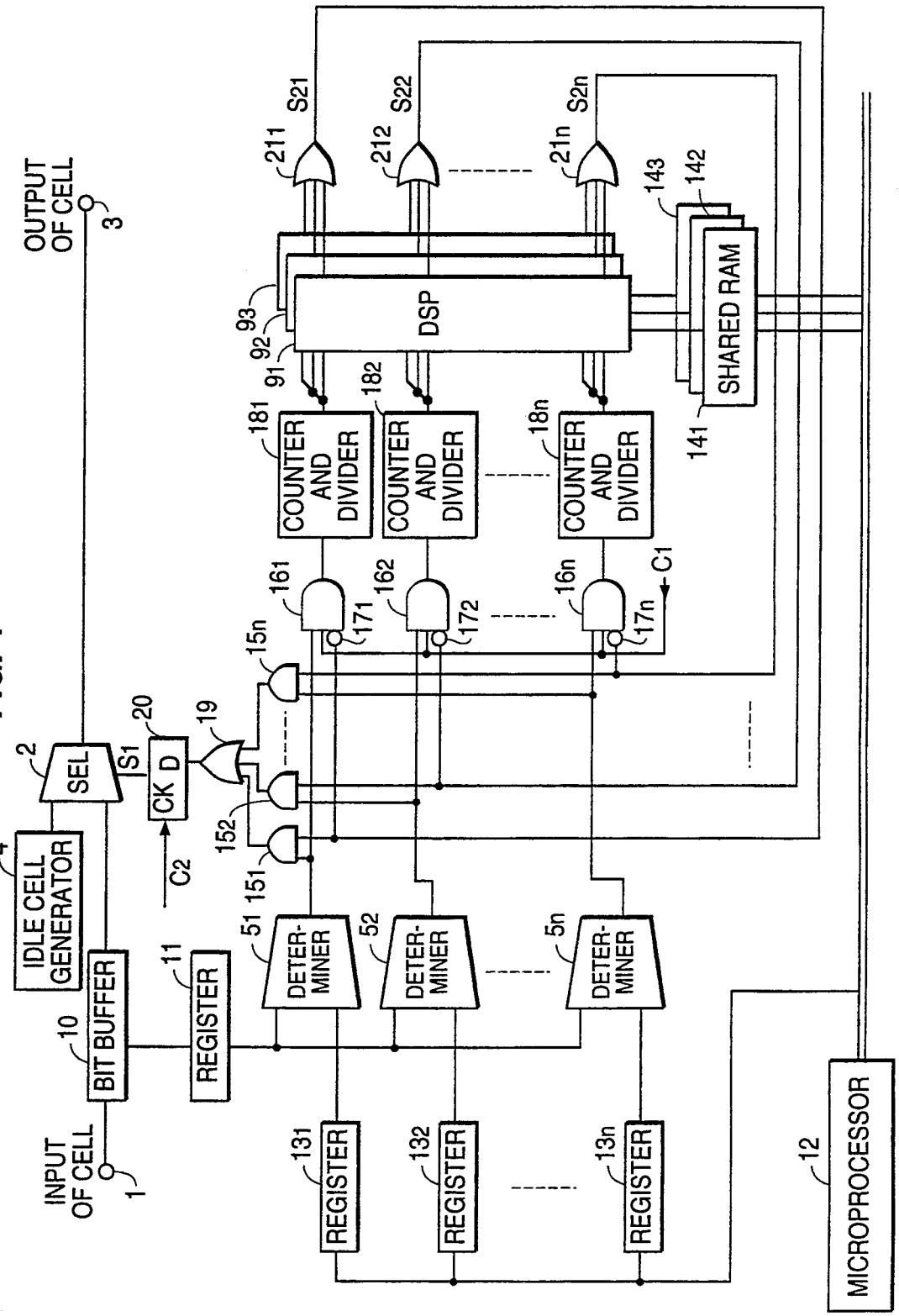
FIG. 4 shows the configuration of an example in which a digital signal processor is provided corresponding to each parameter in the above described embodiment.

FIG. 4 shows an embodiment in which a plurality of DSPs are provided corresponding to each parameter for an average band, maximum band, burst time, etc. to reduce the processing capacity requirement for the DSP 9. In FIG. 4, DSP $9_1$ operates an average band parameter, DSP $9_2$ operates a maximum band parameter, $DSP_3$ operates a burst time parameter, and so on. Thus, each DSP corresponds to a parameter. The output of the microprocessor 12 is inputted through each of the shared RAMs $14_1$, $14_2$, and $14_3$. The output of the counter and dividers $18_1$, $18_2$, . . . , $18_n$ are separately inputted to each of the DSP $9_1$, $9_2$, and $9_3$.

Each output of the DSPs $9_1$, $9_2$, and $9_3$ is outputted through OR circuits $21_1$, $21_2$, . . . , $21_n$. The other parts of the configuration are the same as those shown in FIG. 2, and the explanation is skipped here.

Thus, the DSP has sufficient processing capabilities by providing a DSP for each parameter for an average band, maximum band, burst time, etc., thus enabling an accurate measurement in the counting process.

As described above, illegal cells exceeding the number predetermined between the supplier and the subscriber are invalidated. However, it is obvious that the present invention is not limited to this application. For example, the illegal cells can be marked with "no priority" instead of being invalidated, and then assigned a priority in the SW.

In this embodiment, the present invention has a police function, but it is not limited to that function. For example, the present invention can be provided with a function of measuring traffic in an ATM switching system if necessary.

In the present invention, it is determined whether or not a passing cell is to be measured. If yes, a signal synchronous with the passing cycle of the cell is generated and the signal is applied to the DSP after it is divided. The DSP obtains each parameter related to the number of passing cells by converting the analysis based on the time axis to the area analysis based on the frequency axis. Therefore, the regulation of the number of cells can be conducted accurately on real time. When the present invention is applied as a police function, a passing cell monitoring device can be realized using an ATM switching unit in which various advantages such as accurate regulation of cells, etc. can be obtained.

What is claimed is:

1. A passing cell monitoring device, comprising:
   cell determining means for receiving a plurality of passing cells and determining whether or not ones of said plurality of passing cells are to be observed and outputting a first pulse for each ones of said plurality of passing cells if said ones of said plurality of passing cells are to be observed;

dividing means for receiving said first pulse and for outputting a second pulse when a predetermined number of first pulses are received; and detecting means for performing Fourier transformation based on the cycle time between successive occurrences of said second pulse and calculating a coefficient of each frequency obtained from the Fourier transformation to obtain data related to observed ones of said plurality of passing cells.

2. A passing cell monitoring device according to claim 1, wherein said data related to said ones of said plurality of passing cells indicate burst time, and further comprising discard means for discarding input cells when said burst time exceeds a predetermined value.

3. A passing cell monitoring device according to claim 1, wherein said cell determining means comprises:

a register storing a virtual path identifier/virtual channel identifier VPI/VCI of said ones of said plurality of passing cells; and a comparing circuit for comparing the VPI/VCI stored by said register with a VPI/VCI of said ones of said plurality of passing cells.

4. A passing cell monitoring device, comprising:

cell determining means for receiving a plurality of passing cells and determining whether or not ones of said plurality of passing cells are to be observed and outputting a first pulse for each ones of said plurality of passing cells if said ones of said plurality of passing cells are to be observed;

dividing means for receiving said first pulse and for outputting a second pulse when a predetermined number of said first pulses are received;

detecting means for performing a Fourier transformation based on a cycle of said second pulse and calculating a coefficient of each frequency obtained from the Fourier transformation to obtain data related to observed ones of said plurality of passing cells; and discard means for discarding input cells when said data obtained by said detecting means is related to observed ones of said plurality of passing cells exceeding a predetermined value.

5. A passing cell monitoring device according to claim 4, wherein said detecting means obtains data related to said passing cell by calculating a frequency according to said pulse cycle.

6. A passing cell monitoring device according to claim 4, wherein said data indicate band; and said discard means discards input cells when said band exceeds a predetermined value.

7. A passing cell monitoring device according to claim 4, wherein said data indicate burst time; and said discard means discards input cells when said burst time exceeds a predetermined value.

8. A passing cell monitoring device according to claim 4, wherein said cell determining means comprises:

a register storing for a virtual path identifier/virtual channel identifier VPI/VCI of a header of said passing cell; and a comparing circuit for comparing the VPI/VCI stored by said register with a VPI/VCI of a header of said passing cell.

9. A passing cell monitoring device comprising:

a register for storing a channel identification of a cell;

a comparing circuit for comparing the channel identification stored by said register with a channel identification of a passing cell;

counter and divider means for counting the number of times coincident results are provided by said comparing circuit when no cells are discarded, and for outputting a pulse each time a predetermined number of times are counted;

determining means for receiving said output pulse from said counter and divider means, obtaining a power value of a frequency corresponding to a filter by having said output pulse pass through the filter, and determining whether or not said passing cell is discarded according to the power value; and a selector for discarding input cells according to a result of said determining means and for outputting an idle cell.

10. A passing cell monitoring device according to claim 9, wherein said determining means comprises a digital signal processor.

* * * * *